(12) United States Patent
Dettloff et al.

(10) Patent No.: US 9,004,244 B2
(45) Date of Patent: Apr. 14, 2015

(54) BRAKE ASSEMBLY WITH IMPROVED BRAKE SHOE RETENTION

(71) Applicant: ArvinMeritor Technology, LLC, Troy, MI (US)

(72) Inventors: David J. Dettloff, Shelby Township, MI (US); Roy Hayford, Troy, MI (US); Joshua R. Oliver, Auburn Hills, MI (US); Mark D. Ugo, Ortonville, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 13/803,127

(22) Filed: Mar. 14, 2013

(65) Prior Publication Data

US 2014/0262643 A1  Sep. 18, 2014

(51) Int. Cl.
*F16D 51/00* (2006.01)
*F16D 65/09* (2006.01)

(52) U.S. Cl.
CPC ..................... *F16D 65/09* (2013.01)

(58) Field of Classification Search
CPC ...................................... F16D 65/22
USPC .......... 188/251 R, 325–327; 403/43, 46, 164, 403/165
See application file for complete search history.

(56) References Cited

U.S. PATENT DOCUMENTS

| 2,146,835 | A | * | 2/1939 | Merwin | 403/319 |
| 2,837,365 | A | * | 6/1958 | Schlueter | 292/240 |
| 4,157,747 | A | | 6/1979 | Getz et al. | |
| 4,311,405 | A | * | 1/1982 | Hawley | 403/142 |
| 4,353,442 | A | * | 10/1982 | Correa | 188/330 |
| RE31,531 | E | | 3/1984 | Williams | |
| 4,838,623 | A | * | 6/1989 | Mineart | 305/204 |
| 6,164,864 | A | * | 12/2000 | Beach et al. | 403/385 |
| 6,179,510 | B1 | * | 1/2001 | Meicke et al. | 403/306 |
| 6,648,111 | B2 | | 11/2003 | Catania | |
| 6,739,789 | B2 | * | 5/2004 | Yagyu | 403/134 |
| 7,351,000 | B2 | * | 4/2008 | Meggiolan | 403/322.4 |
| 7,984,576 | B2 | * | 7/2011 | Miller et al. | 37/468 |
| 7,993,070 | B2 | * | 8/2011 | Kull et al. | 403/316 |
| 2002/0162422 | A1 | * | 11/2002 | Kerzhner | 81/58.2 |
| 2006/0016652 | A1 | * | 1/2006 | Clark et al. | 188/330 |
| 2009/0277369 | A1 | * | 11/2009 | Gai et al. | 114/286 |

* cited by examiner

*Primary Examiner* — Vishal Sahni
(74) *Attorney, Agent, or Firm* — Brooks Kushman P.C.

(57) ABSTRACT

A brake assembly having a brake shoe and an anchor pin. The brake shoe may have an anchor pin slot that may include first and second connecting surfaces that extend from an arcuate bearing surface. The anchor pin may have a flat and may be inserted into the anchor pin slot when the flat is aligned with the second connecting surface.

14 Claims, 7 Drawing Sheets

BRAKE ASSEMBLY WITH IMPROVED BRAKE SHOE RETENTION

TECHNICAL FIELD

The present application relates to a brake assembly having a brake shoe.

BACKGROUND

A brake assembly having an anchor pin is disclosed in U.S. Pat. No. 6,648,111.

SUMMARY

In at least one embodiment, a brake assembly is provided. The brake assembly may have a brake shoe and an anchor pin. The brake shoe may have a web that may have an anchor pin slot. The anchor pin slot may extend from an end of the web and may include an arcuate bearing surface, a first connecting surface, and a second connecting surface. The first and second connecting surfaces may extend from the arcuate bearing surface to the end of the web. The second connecting surface may be separated from the first connecting surface by a gap. The anchor pin may have an end portion that may be configured to be received in the anchor pin slot. The end portion may have a flat. The anchor pin may be insertable through the gap when the flat is aligned with the second connecting surface.

In at least one embodiment, a brake assembly is provided. The brake assembly may include an anchor pin and a brake shoe. The anchor pin may be configured to couple the brake shoe to a spider. The brake shoe may have a table for supporting a friction material and a web that extends from the table. The web may have an anchor pin slot that extends from first and second end surfaces. The anchor pin slot may be at least partially defined by an arcuate bearing surface, a first connecting surface, and a second connecting surface. The arcuate bearing surface may be radially disposed about an axis. The first connecting surface may extend from the arcuate bearing surface to the first end surface. The second connecting surface may extend from the arcuate bearing surface to the second end surface. A length of the first connecting surface from the arcuate bearing surface to the first end surface may be greater than a length of the second connecting surface from the arcuate bearing surface to the second end surface.

In at least one embodiment, a brake assembly is provided. The brake assembly may include a brake shoe and an anchor pin. The brake shoe may have a web that may include an anchor pin slot that extends from an end of the web. The anchor pin slot may be at least partially defined by an arcuate bearing surface, a first connecting surface, and a second connecting surface. The first and second connecting surfaces may extend from the arcuate bearing surface to the end of the web. The second connecting surface may be separated from the first connecting surface by a gap. The anchor pin may have an end portion that may be configured to be received in the anchor pin slot. The end portion may have a first flat and a second flat. The anchor pin is insertable through the gap when the first and second flats are disposed substantially parallel to the first and second connecting surfaces, respectively.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
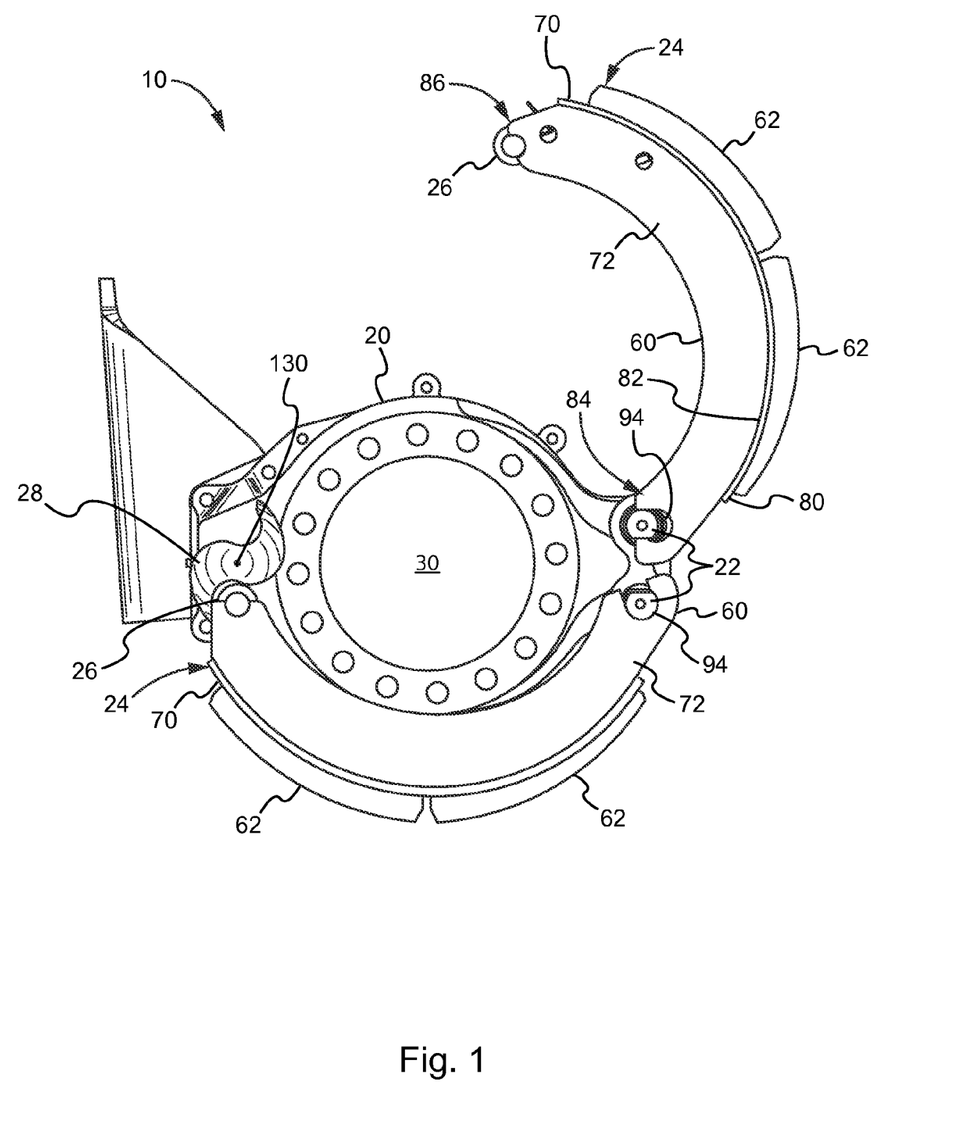
FIG. 1 is a side view of a brake assembly.

Referring to FIG. 1, an exemplary brake assembly 10 is shown. The brake assembly 10 may be provided with a vehicle, such as a motor vehicle like a truck, bus, farm equipment, military transport or weaponry vehicle, or cargo loading equipment for land, air, or marine vessels. In addition, the brake assembly 10 may be provided on a trailer that may be coupled to or provided with a motor vehicle.

The brake assembly 10 may be configured as a friction brake that may slow or inhibit rotation of at least one associated wheel assembly. In FIG. 1, the brake assembly 10 has a drum brake configuration. In a drum brake configuration, a brake drum may extend continuously around brake shoe assemblies that may be configured to engage the brake drum to slow rotation of a wheel assembly. The brake drum may be disposed between a wheel assembly and a wheel hub assembly that may rotatably support the wheel assembly. In at least one embodiment, the brake assembly 10 may include a spider 20, at least one anchor pin 22, at least one brake shoe assembly 24, a cam roller 26, and a camshaft 28.

Figure 2:
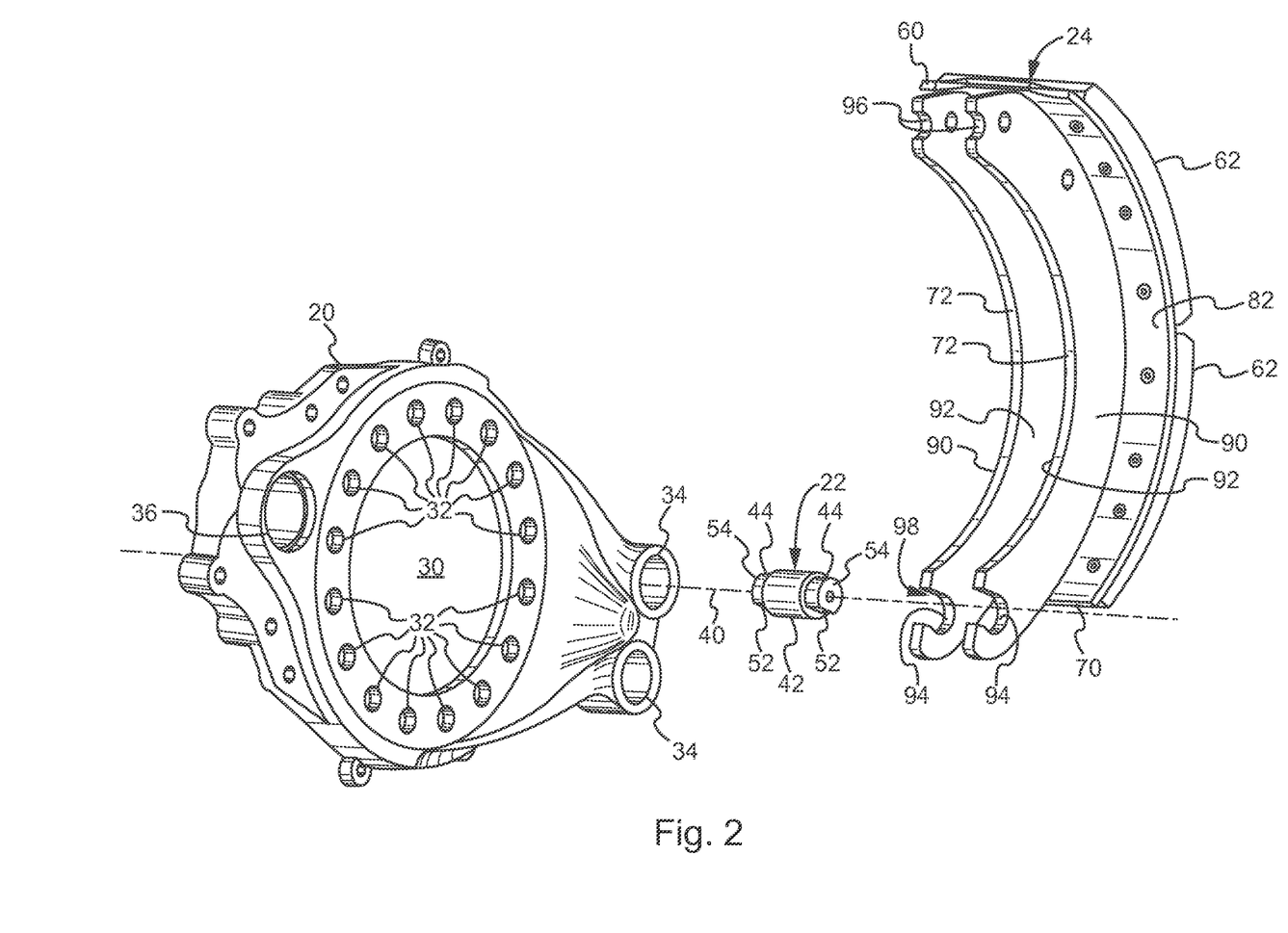
FIG. 2 is an exploded perspective view of a portion of the brake assembly.

Referring to FIGS. 1 and 2, the spider 20 is shown in more detail. The spider 20 may support various components of the brake assembly 10. In addition, the spider 20 may facilitate mounting of the brake assembly 10 to the vehicle. For example, the spider 20 may be fixedly disposed on or with respect to an axle assembly or steering knuckle. In at least one embodiment, the spider 20 may include an opening 30 through which an axle and/or a spindle may extend. For example, a spindle may extend through the opening 30 and may support one or more wheel bearings that support and facilitate rotation of a wheel assembly. The spider 20 may also include at least one spider mounting hole 32, at least one anchor pin hole 34, and a camshaft opening 36.

A spider mounting hole 32 may facilitate mounting of the spider 20 to the vehicle. A plurality of spider mounting holes 32 may be arranged around the opening 30. Each spider mounting hole 32 may receive a fastener, such as a bolt, that may extend through the spider mounting hole 32 and couple the spider 20 to an axle assembly or steering knuckle.

The anchor pin hole 34 may receive an anchor pin 22 that facilitates mounting of a brake shoe assembly 24 will be discussed in more detail below. In FIG. 2, two anchor pin holes 34 are provided that are generally disposed at an end of the spider 20 that is disposed opposite the camshaft opening 36. Each anchor pin hole 34 may receive a different anchor pin 22, which in turn may support a brake shoe assembly 24.

The camshaft opening 36 may receive the camshaft 28. More specifically, the camshaft 28 may extend through the camshaft opening 36 and may be configured to actuate a cam roller 26 that may support a corresponding brake shoe assembly 24.

Figure 3:
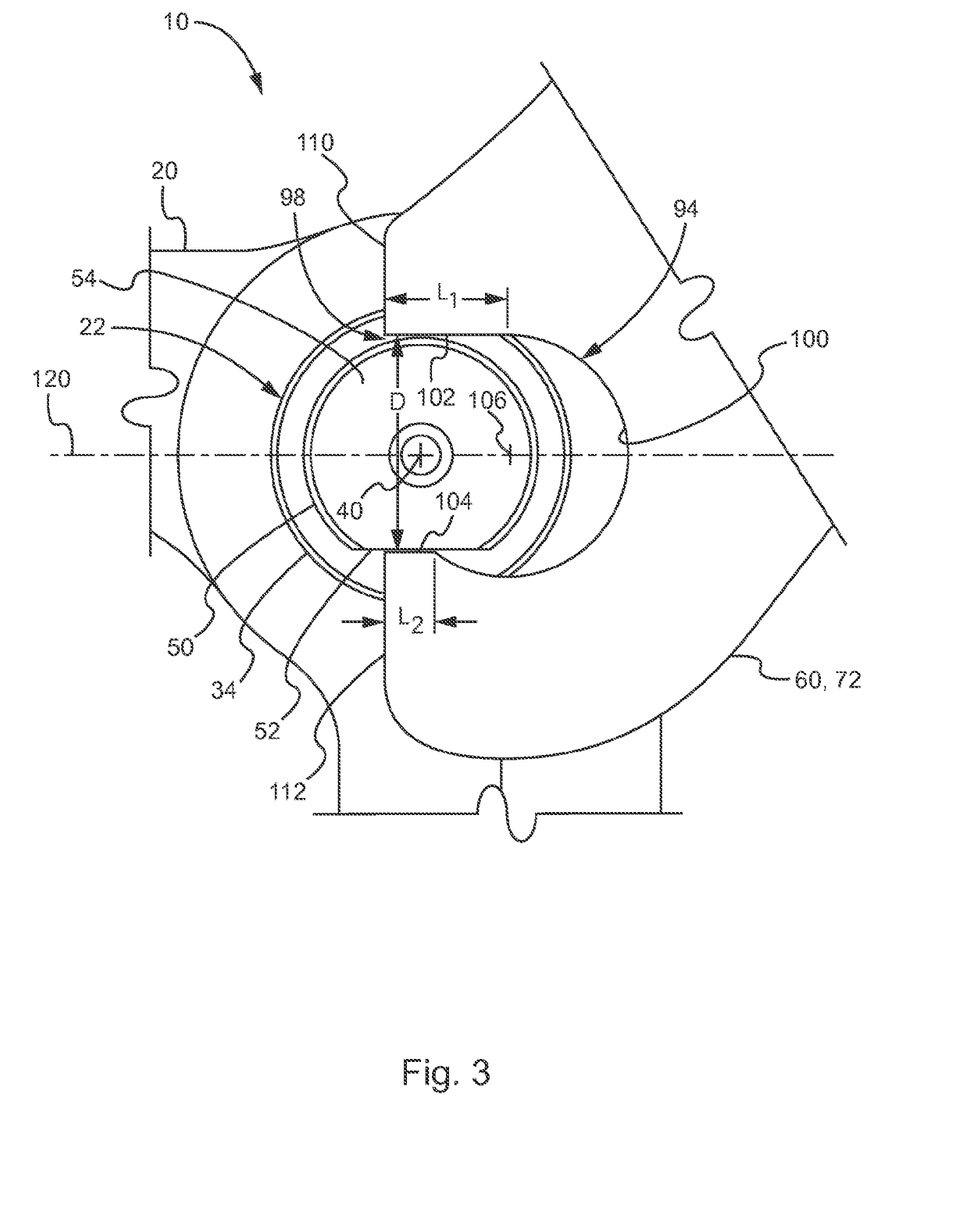
FIG. 3 is a magnified view of a portion of the brake assembly shown in FIG. 1.

Referring to FIGS. 1-3, the anchor pin 22 may support and facilitate mounting of the brake shoe assembly 24 to the spider 20. The anchor pin 22 may be integrally formed with the spider 20 or provided as a separate component. The anchor pin 22 may be received in the anchor pin hole 34 if provided as a separate component and may be fixedly positioned with respect to the spider 20 in one or more embodiments. The anchor pin 22 may extend along an axis 40 and may have a body portion 42 and a pair of end portions 44.

The body portion 42 may be received in the anchor pin hole 34. The body portion 42 may be substantially cylindrical and may have an outer surface that may be radially disposed with respect to the axis 40. The body portion 42 may or may not have a larger diameter than an end portion 44.

The end portions 44 may extend from opposite ends of the body portion 42. Each end portion 44 may have an arcuate surface 50 and at least one flat 52.

The arcuate surface 50 may be radially disposed with respect to the axis 40. The arcuate surface 50 may have a diameter that is less than the body portion 42 in one or more embodiments.

The flat 52 may intersect the arcuate surface 50. For example, the flat 52 may extend along a chord that may be spaced apart from the axis 40 and that may intersect the arcuate surface 50 at two locations or along two edges. The flat 52 may be substantially planar and may extend from the body portion 42 to an end surface 54 of the end portion 44. In one or more embodiments, the flats 52 of the anchor pins 22 may face toward each other or extend substantially parallel to each other when mounted on the spider 20.

The brake shoe assembly 24 may be configured to slow or inhibit the rotation of a wheel or wheel end assembly. In FIG. 1, two brake shoe assemblies 24 are shown. The brake shoe assembly 24 near the bottom of FIG. 1 is shown in an installed position in which the brake shoe assembly 24 is connected to the spider 20 by an anchor pin 22 and a cam roller 26. The brake shoe assembly 24 shown near the top of FIG. 1 is shown prior to installation and rotation about the anchor pin 22. The brake shoe assembly 24 may include a brake shoe 60 and a friction material 62.

The brake shoe 60 may be a structural member of a brake shoe assembly 24 and may facilitate mounting of the brake shoe assembly 24 to the spider 20. The brake shoe 60 may include a table 70 and at least one web 72.

The table 70 may be configured to support the friction material 62. The table 70 may have a unitary or one-piece construction. In addition, the table 70 may be curved or extend along an arc that may have a substantially constant radius. The table 70 may include a first table surface 80 and a second table surface 82.

The first table surface 80 may be an outer surface of the brake shoe 60. The first table surface 80 may support and may engage the friction material 62.

The second table surface 82 may be disposed opposite the first table surface 80. The second table surface 82 may be disposed generally parallel to the first table surface 80.

Referring to FIGS. 1-3, at least one web 72 may extend from the table 70. In FIG. 2, two webs 72 are shown that extend from the table 70 and are spaced apart from each other. The webs 72 may have the same or similar configurations. The webs 72 may extend from and may be disposed substantially perpendicular to the second table surface 82 in one or more embodiments. The webs 72 may be mounted to the table 70 in any suitable manner, such as by welding or with one or more fasteners. Each web 72 may have a first end 84 that may be disposed proximate the anchor pin 22 and a second end 86 that may be disposed proximate the cam roller 26. In addition, each web 72 may include a first surface 90, a second surface 92, an anchor pin slot 94, and a cam roller slot 96.

The first and second surfaces 90, 92 may extend from the table 70 and may be disposed opposite each other. The first and second surfaces 90, 92 may be substantially planar and may be disposed generally parallel to each other in one or more embodiments. In addition, the first and second surfaces 90, 92 may extend substantially perpendicular to the table 70.

The anchor pin slot 94 may configured to receive the anchor pin 22. The anchor pin slot 94 may be disposed at the first end 84 of the web 72 and may extend from the first surface 90 to the second surface 92. The anchor pin slot 94 may be an open ended slot that may define a gap 98 that may facilitate insertion of the anchor pin 22. In at least one embodiment, the anchor pin slot 94 may be at least partially defined by an arcuate bearing surface 100, a first connecting surface 102, and a second connecting surface 104.

The arcuate bearing surface 100 may be radially disposed with respect to an axis 106. In addition, the arcuate bearing surface 100 may extend from the first surface 90 to the second surface 92. The arcuate bearing surface 100 may engage the anchor pin 22 when the brake shoe assembly 24 is in the installed position. Moreover, the arcuate surface 50 of the anchor pin 22 may continuously engage the arcuate bearing surface 100 when the brake shoe assembly 24 is installed to help distribute load forces.

The first connecting surface 102 may extend from a first end of the arcuate bearing surface 100 to a first end surface 110 of the web 72. The first connecting surface 102 may extend tangentially from the arcuate bearing surface 100 and may be disposed substantially perpendicular to the first end surface 110.

The second connecting surface 104 may extend from a second end of the arcuate bearing surface 100 to a second end surface 112 of the web 72. The second connecting surface 104 may be disposed substantially perpendicular to the first end surface 110. In addition, the second connecting surface 104 may be spaced apart from and disposed substantially parallel to the first connecting surface 102. The second connecting surface 104 may not extend tangentially from the arcuate bearing surface 100.

The first end surface 110 may be disposed on an opposite side of the anchor pin slot 94 from the second end surface 112. The first end surface 110 and the second end surface 112 may be aligned with each other or disposed in a substantially coplanar relationship.

As is best shown in FIG. 3, the first and second connecting surfaces 102, 104 may have different lengths. For example, the first connecting surface 102 may have a length $L_1$ that may extend from the arcuate bearing surface 100 to the first end surface 110. The second connecting surface 104 may have a length $L_2$ that may extend from the arcuate bearing surface 100 to the second end surface 112. The length $L_1$ of the first connecting surface 102 may be greater than the length $L_2$ of the second connecting surface 104.

The first connecting surface 102 may be spaced apart from the second connecting surface 104 by a distance D. The distance D may be less than a diameter of the end portion 44 of the anchor pin 22. As such, the distance D between the first and second connecting surfaces 102, 104, or width of the gap 98, may be less than the diameter of the arcuate surface 50 of the end portion 44 of the anchor pin 22 to help improve retention of the brake shoe 60 on the anchor pin 22 as will be discussed in more detail below.

The anchor pin slot 94 may be asymmetric due to the configuration of the first and second connecting surfaces 102, 104. For example, the second connecting surface 104 may be disposed closer to an anchor pin slot plane 120 than the first connecting surface 102. The anchor pin slot plane 120 may through from the axis 106 and may be disposed substantially parallel to the first and second connecting surfaces 102, 104.

Referring to FIGS. 1 and 2, the cam roller slot 96 may be configured to receive the cam roller 26. The cam roller slot 96 may be disposed at the second end 86 of the web 72 and may extend from the first surface 90 to the second surface 92. The cam roller slot 96 may be an open ended slot that may be radially disposed about an axis.

The friction material 62, which may also be called a brake lining, may be disposed on the brake shoe 60. More specifically, the friction material 62 may be fixedly disposed on the first table surface 80 and may face toward the brake drum. The friction material 62 may engage the brake drum during vehicle braking and may be spaced apart from the brake drum when the friction braking is not being applied.

The cam roller 26 may facilitate movement of a brake shoe assembly 24. In FIG. 1, a cam roller 26 is associated with each brake shoe assembly 24. The cam roller 26 may be disposed in the cam roller slot 96 and may be disposed between the brake shoe 60 and the camshaft 28 when a brake shoe assembly 24 is in the installed position.

The camshaft 28 may be configured to actuate the brake shoe assemblies 24. The camshaft 28 may extend along and may rotate about a camshaft axis 130. In addition, the camshaft 28 may extend through the camshaft opening 36 in the spider 20. The camshaft 28 may include a cam disposed at a first end. The cam may be an S-cam and may be configured to engage the cam rollers 26. Rotation of the camshaft 28 about the camshaft axis 130 in a first direction may actuate cam rollers 26 and the brake shoe assemblies 24 such that the friction material 62 moves toward or engages an inner surface of the brake drum to brake or slow or inhibit rotation of an associated wheel or wheel end assembly. The camshaft 28 may be rotated by an actuator that may be coupled to a second end of the camshaft 28 via a slack adjuster. The actuator may be of any suitable type, such as a pneumatic, hydraulic, electrical, or electromechanical actuator. The slack adjuster may be provided to compensate for brake wear or wear of the friction material 62.

Figure 4:
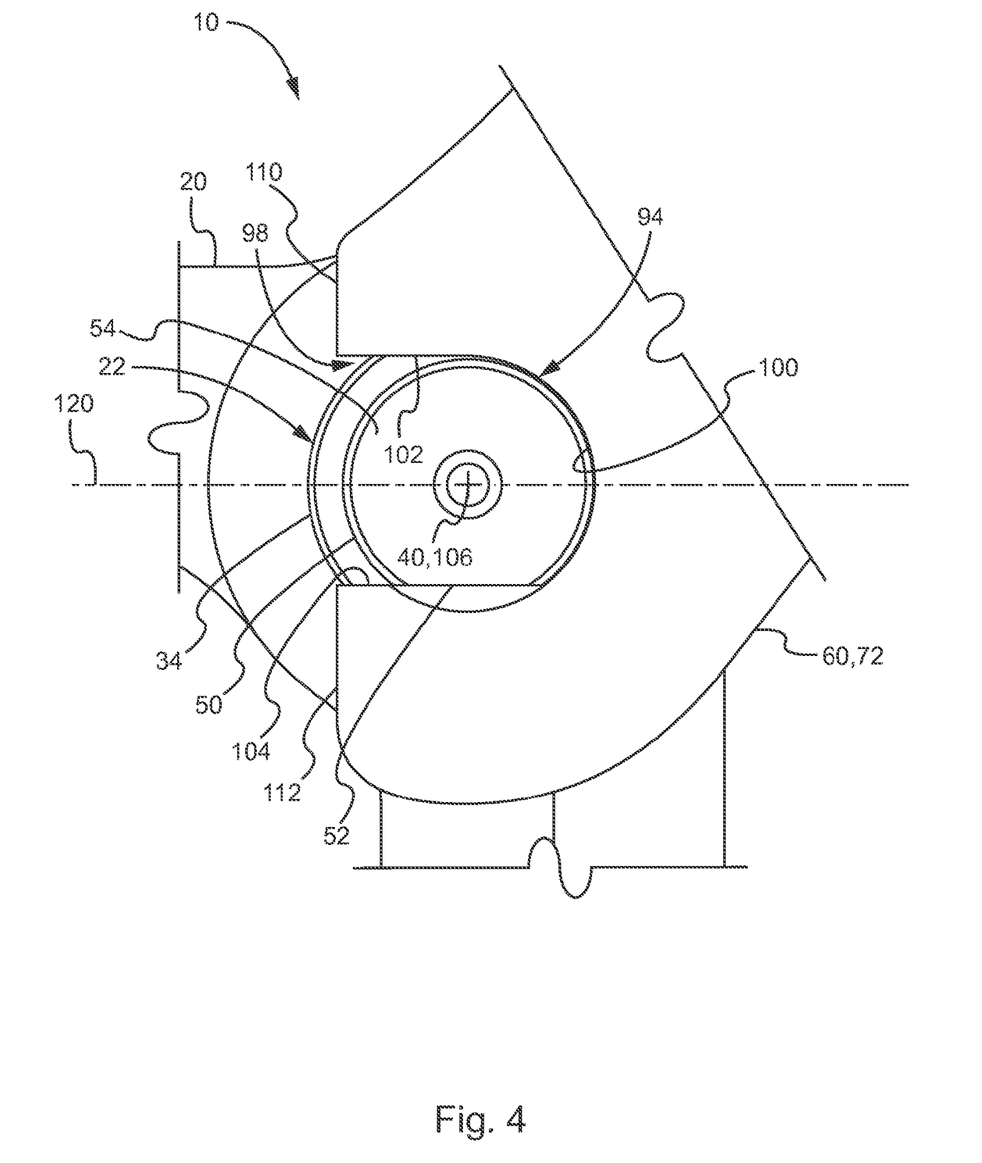
FIG. 4 is a magnified view of a portion of the brake assembly showing a brake shoe prior to rotation about an anchor pin.
Figure 5:
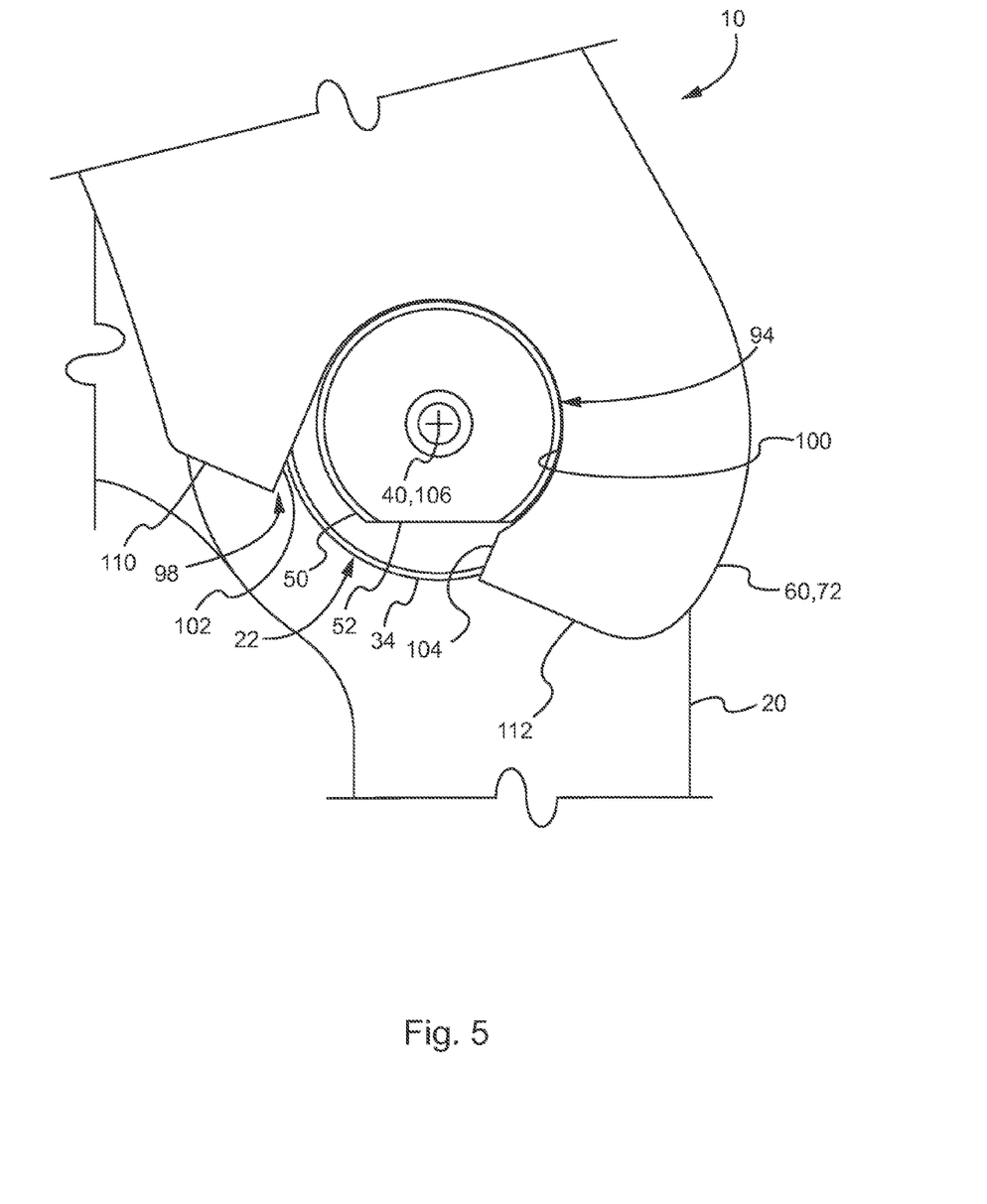
FIG. 5 is a magnified view of a portion of the brake assembly showing a brake shoe after rotation about the anchor pin.

Referring to FIGS. 3-5, installation of a brake shoe assembly 24 will be discussed in more detail.

In FIG. 3, the anchor pin 22 is partially disposed in the anchor pin slot 94. More specifically, the anchor pin 22 is disposed in the gap 98 between the first connecting surface 102 and the second connecting surface 104 and is spaced apart from the arcuate bearing surface 100. The anchor pin 22 may not fit in the gap 98 unless the flat 52 faces toward and is aligned with or disposed substantially parallel to the second connecting surface 104. The brake shoe assembly 24 may not rotate about the anchor pin 22 in this position due to interference between the flat 52 and one or more surfaces that define the anchor pin slot 94.

In FIG. 4, the anchor pin 22 is fully inserted into the anchor pin slot 94. As such, the anchor pin 22 may be disposed proximate or may engage the arcuate bearing surface 100. The anchor pin may be spaced apart from the first and second connecting surfaces 102, 104 and may not be disposed in the gap 98 when fully inserted into the anchor pin slot 94. In addition, the axis 40 of the anchor pin 22 may be substantially aligned with the axis 106 associated with the arcuate bearing surface 100. The brake shoe assembly 24 may be free to rotate about the anchor pin 22 in this position.

In FIG. 5, the brake shoe assembly 24 is rotated about the anchor pin 22 to the installed position. For example, the brake shoe assembly 24 may be rotated in a counterclockwise direction about the anchor pin 22 and axes 40 and/or 106 from the perspective shown in FIGS. 1 and 4 until the cam roller 26 engages the cam of the camshaft 28 and the cam roller slot 96 in the webs 72. The anchor pin 22 may be held in the anchor pin slot 94 due to the configuration of the end portion 44 of the anchor pin 22 and the configuration of the first and second connecting surfaces 102, 104. More specifically, the anchor pin 22 may not slide through the gap 98 between the first and second connecting surfaces 102, 104 since the distance $D_1$ between the first and second connecting surfaces 102, 104 is less than a diameter of the arcuate surface 50 of the end portion 44 of the anchor pin 22. Thus the gap 98 is too small to permit passage of the anchor pin 22.

The brake shoe assembly 24 may be removed from the spider 20 and the anchor pin 22 by reversing the sequence of steps shown in FIGS. 3-5. For example, the brake shoe assembly 24 may be rotated clockwise from the perspective shown until the flat 52 is aligned with the second connecting surface 104 and then slid to the right such that the flat 52 is disposed adjacent to the second connecting surface 104 and ultimately exits the anchor pin slot 94.

Figure 6:
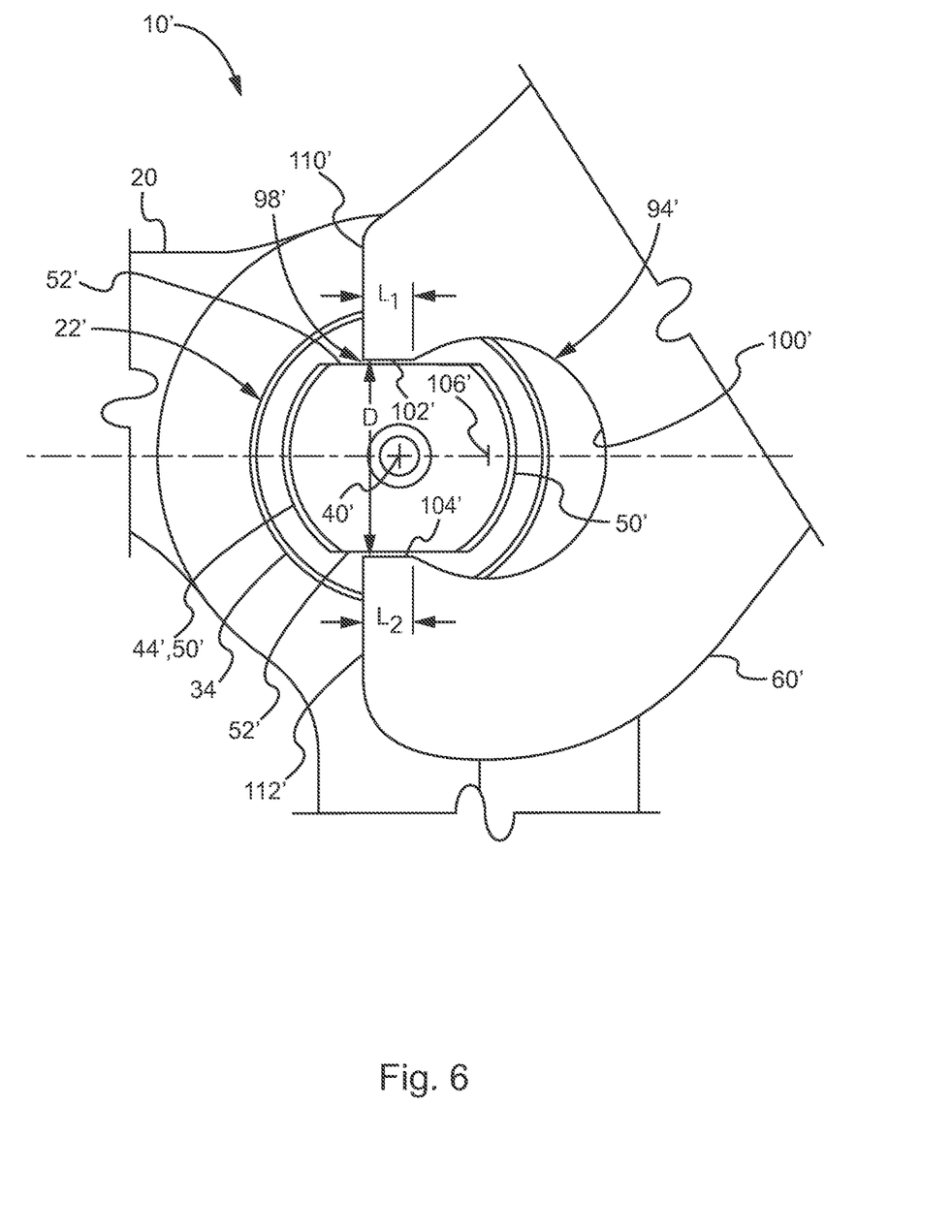
FIGS. 6 and 7 are magnified view of a portion of another embodiment of a brake assembly.
Figure 7:
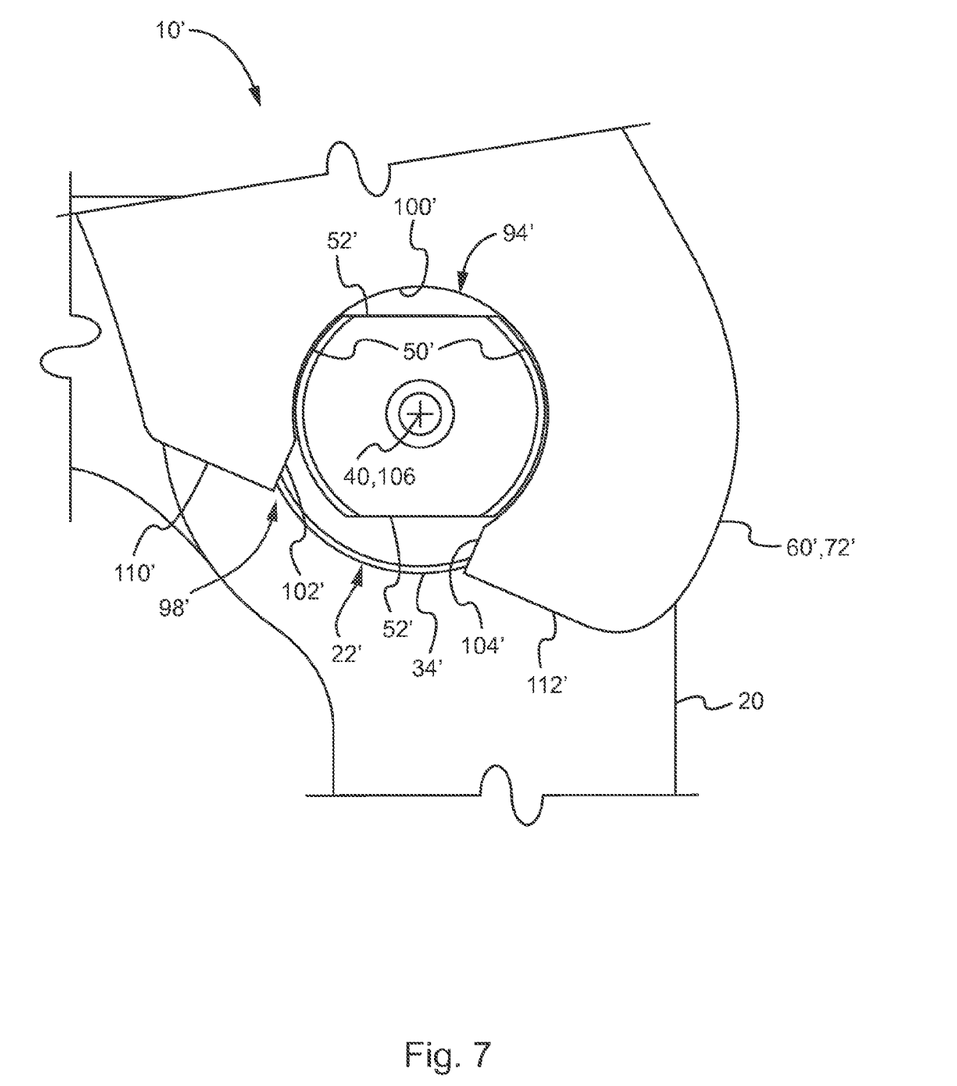

Referring to FIGS. 6 and 7, another embodiment of a brake assembly 10' is shown. In this embodiment, the anchor pin 22' has an end portion 44' that has a pair of arcuate surfaces 50' and a pair of flats 52'. The arcuate surfaces 50' may be radially disposed with respect to the axis 40' and may be spaced apart from each other. The flats 52' may be disposed opposite each other and may extend between the arcuate surfaces 50'. The flats 52' may be substantially planar and similar to the flats 52 previously described.

The brake shoe 60' may have at least one web 72' that may have an anchor pin slot 94'. The anchor pin slot 94' may be at least partially defined by an arcuate bearing surface 100', a first connecting surface 102', and a second connecting surface 104'. The first and second connecting surfaces 102', 104' may be spaced apart from each other and may be disposed substantially parallel to each other in one or more embodiments. The first connecting surface 102' may extend an end of the arcuate bearing surface 100' to the first end surface 110'. The second connecting surface 104' may extend the opposite end of the arcuate bearing surface 100' to the second end surface 112'. Moreover, the first and second connecting surfaces 102', 104' may be disposed substantially perpendicular with respect to the first and second end surfaces 110', 112', respectively. The first and second connecting surfaces 102', 104' may not extend tangentially from the arcuate bearing surface 100', which may be disposed about axis 106'.

The length $L_1$ of the first connecting surface 102' from the arcuate bearing surface 100' to the first end surface 110' may be substantially similar or equal to the length $L_2$ of the second connecting surface 104' from the arcuate bearing surface 100' to the second end surface 112'. In addition, the distance D between the first and second connecting surfaces 102', 104' may be less than the diameter of the end portion 44' of the anchor pin 22', or diameter measured with respect to the arcuate surfaces 50'. As such, the anchor pin 22' may be inserted through the gap 98' when the first and second flats 52' are disposed substantially parallel to the first and second connecting surfaces 102', 104', respectively. Once the anchor pin 22' is fully inserted into the anchor pin slot 94', the flats 52' are spaced apart from the first and second connecting surfaces 102', 104' respectively and the brake shoe assembly 24' and brake shoe 60' may be rotated about the anchor pin 22' to the installed position shown in FIG. 7 in the manner previously described above.

The anchor pin and brake shoe configurations described above may help retain a brake shoe on an anchor pin such that retaining springs used to secure a brake shoe may be eliminated or reduced, thereby eliminating weight and associated costs. In addition, the anchor pin and brake shoe configurations may help prevent brake shoe assemblies from being installed improperly or in an incorrect orientation. Furthermore, the brake shoe may be self-retaining on the anchor pin and may help avoid or inhibit separation between the brake shoe and anchor pin, thereby allowing the anchor pin to provide continuous support across the arcuate bearing surface of a brake shoe.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
   a spider;
   a brake shoe that has a web that has first and second end surfaces that are disposed substantially parallel to each other and an anchor pin slot, wherein the anchor pin slot extends from an end of the web and includes:
      an arcuate bearing surface;
      a first connecting surface that extends from the arcuate bearing surface to the first end surface such that the first connecting surface is disposed substantially perpendicular to the first end surface from the first end surface to the arcuate bearing surface; and
      a second connecting surface that extends from the arcuate bearing surface to the second end surface such that the second connecting surface is disposed substantially perpendicular to the second end surface from the second end surface to the arcuate bearing surface, wherein the second connecting surface is separated from the first connecting surface by a gap; and
   an anchor pin that couples the brake shoe to the spider, wherein the anchor pin is fixedly positioned with respect to the spider and has an end portion that is configured to be received in the anchor pin slot, wherein the end portion has a flat;
   wherein the first connecting surface has a greater length than the second connecting surface;
   wherein the anchor pin is insertable through the gap when the flat is aligned with the second connecting surface; and
   wherein the brake shoe is rotated about the anchor pin to an installed position when the anchor pin is fully inserted into the anchor pin slot such that a portion of the flat is disposed in the gap and does not engage the first and second connecting surfaces when in the installed position.

2. The brake assembly of claim 1 wherein the anchor pin is insertable through the gap when the flat is disposed substantially parallel to the second connecting surface.

3. The brake assembly of claim 1 wherein the anchor pin is retained in the anchor pin slot when the flat is not disposed substantially parallel to the second connecting surface.

4. The brake assembly of claim 1 wherein the first connecting surface is disposed substantially parallel to the second connecting surface.

5. The brake assembly of claim 1 wherein the anchor pin does not rotate in the anchor pin slot.

6. The brake assembly of claim 1 wherein the first connecting surface extends tangentially from the arcuate bearing surface and the second connecting surface does not extend tangentially from the arcuate bearing surface.

7. The brake assembly of claim 1 wherein the brake shoe is rotatable about the anchor pin when the flat does not engage the second connecting surface.

8. The brake assembly of claim 1 wherein a distance from the first connecting surface to the second connecting surface is less than a diameter of the end portion of the anchor pin.

9. A brake assembly comprising:
   a brake shoe that includes a table for supporting a friction material and a web that extends from the table, wherein the web has an anchor pin slot that extends from first and second end surfaces that are disposed substantially parallel to each other, wherein the anchor pin slot is at least partially defined by:
      an arcuate bearing surface that is radially disposed about an axis;
      a first connecting surface that extends from the arcuate bearing surface to the first end surface such that the first connecting surface is disposed substantially perpendicular to the first end surface from the first end surface to the arcuate bearing surface; and
      a second connecting surface that extends from the arcuate bearing surface to the second end surface such that the second connecting surface is disposed substantially perpendicular to the second end surface from the second end surface to the arcuate bearing surface and substantially parallel to the first connecting surface; and
   an anchor pin that couples the brake shoe to a spider, wherein the anchor pin is fixedly positioned with respect to the spider and does not rotate in the anchor pin slot;
   wherein a length of the first connecting surface from the arcuate bearing surface to the first end surface is greater than a length of the second connecting surface from the arcuate bearing surface to the second end surface.

10. The brake assembly of claim 9 wherein the first and second end surfaces are coplanar.

11. The brake assembly of claim 9 wherein the anchor pin has an arcuate surface and a flat that intersects the arcuate surface, wherein the anchor pin is insertable between the first and second connecting surfaces when the arcuate surface is disposed proximate the first connecting surface and the flat is disposed proximate the second connecting surface.

12. The brake assembly of claim 11 wherein a diameter of the arcuate surface is greater than a distance from the first connecting surface to the second connecting surface.

13. The brake assembly of claim 9 wherein the first connecting surface extends tangentially from the arcuate bearing surface and the second connecting surface does not extend tangentially from the arcuate bearing surface.

14. The brake assembly of claim 9 wherein an anchor pin slot plane extends through the axis and is disposed substantially parallel to the first and second connecting surfaces, wherein the second connecting surface is disposed closer to anchor pin slot plane than the first connecting surface.

* * * * *